July 17, 1962 R. A. CAUGHEY 3,044,111
MACHINE FOR THE CONTINUOUS MANUFACTURE
OF FIBROUS BOARD
Filed Jan. 15, 1959 2 Sheets-Sheet 1
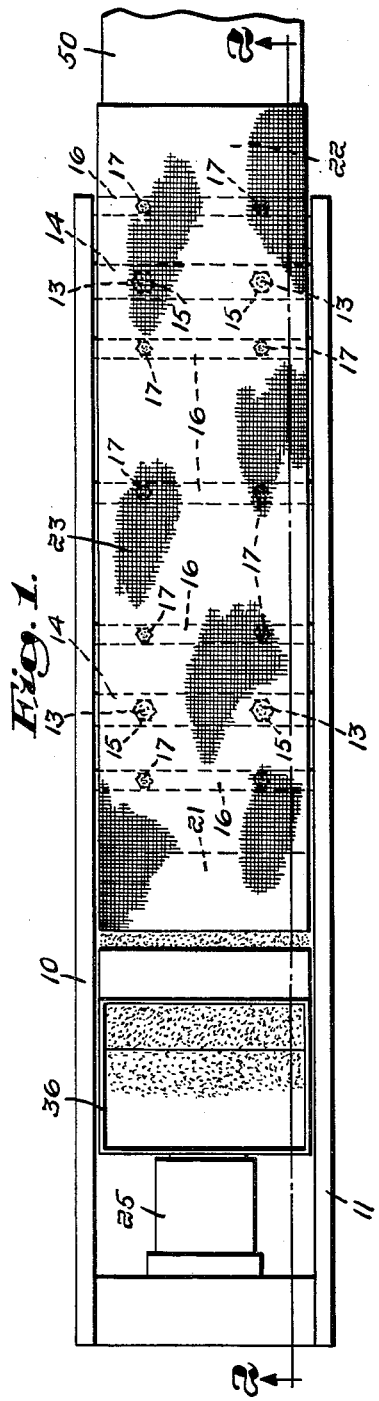
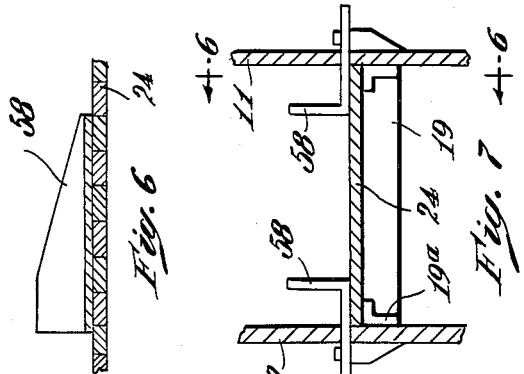
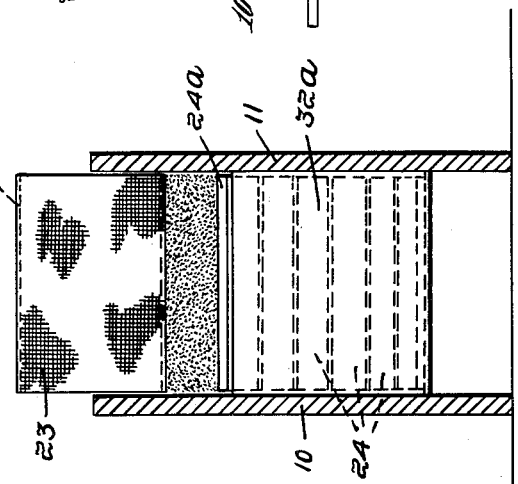
Inventor:
Robert A. Caughey,
by Roberts, Cushman & Grover
Attorney July 17, 1962
R. A. CAUGHEY
3,044,111
MACHINE FOR THE CONTINUOUS MANUFACTURE
OF FIBROUS BOARD
Filed Jan. 15, 1959
2 Sheets-Sheet 2
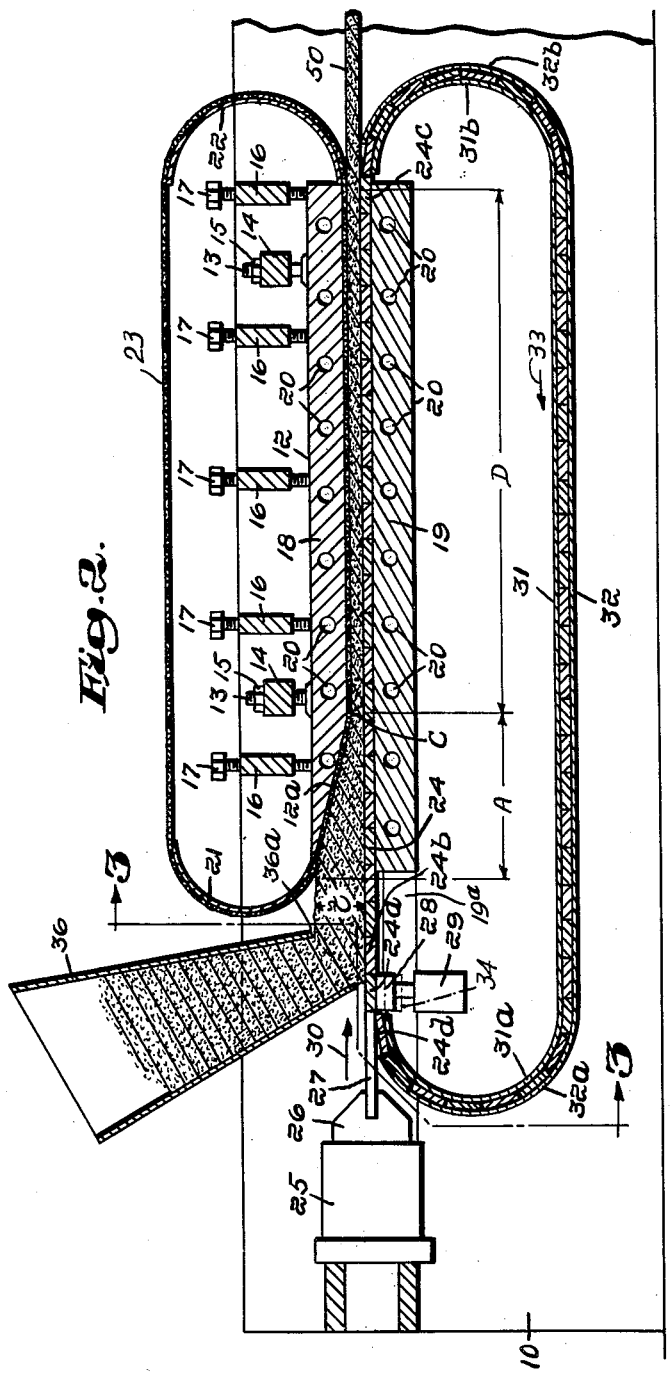
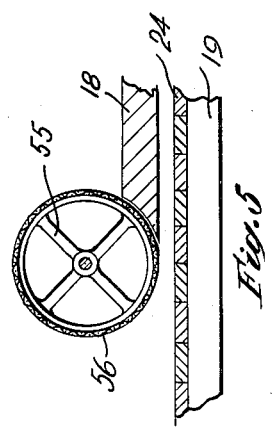
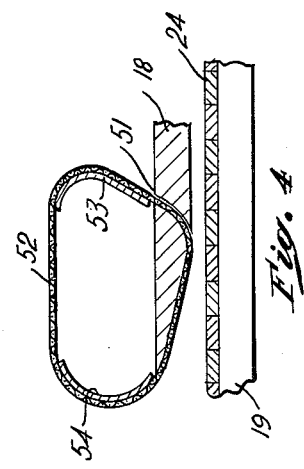
Inventor:
Robert A. Caughey,
by Roberts, Cushman & Grover
Attorney 3,044,111
MACHINE FOR THE CONTINUOUS MANU-
FACTURE OF FIBROUS BOARD
Robert A. Caughey, Antrim, N.H., assignor to Antrim
Moulding Company, Inc., Antrim, N.H., a corporation
of New Hampshire
Filed Jan. 15, 1959, Ser. No. 786,950
15 Claims. (Cl. 18—4)

This invention relates to the manufacture of composition board from a mat or felt or fibrous material, for example, board of the type made of wood particles bonded together by a thermo-setting resin and referred to in the building and furniture trades as "particle board."

According to the conventional method of manufacturing particle board, the wood particles are mixed with liquid or powdered resin and the mixture is spread in a mat on a metal caul. The caul is then placed in a heated press and the mat is compressed under heat for a sufficient time to cure the resin binder. The formed board is then removed from the press, trimmed, and usually sanded. This method of manufacturing boards has several disadvantages. For example, it is not possible to form the edges with sufficient uniformity to mold a board to the desired finished size. An allowance must be made for end and edge trim, resulting in a substantial waste of material. It is also difficult to mold to the exact thickness, and the additional sizing operation which is required to trim the board to its finished thickness results in further waste of material; and also, because the necessary increase in thickness requires an increased cure time, the relative rate of production is decreased. Furthermore, the manufacture of individual boards in this manner is relatively slow because of the time required to bring the center of the board up to curing temperature. For example, for a ¾ inch board about six or seven minutes may be required to heat the center of the board to curing temperature. The size of board which can be produced is limited by the area of the press platens. Finally, considerable time and labor is involved in such operations as moving the cauls in and out of the press, separating the molded boards from the cauls, returning the empty cauls to the filling station, and transferring the boards to the trimming and sizing machinery.

Certain machines have been developed for continuous production of particle board, but the machines at present available are so cumbersome and costly that very little saving is realized as compared to the flat press method of production.

The general object of this invention is to provide a machine for manufacturing particle board with a minimum of waste, and at low cost. Another object is to provide a machine, suitable for continuous production, which is simple and inexpensive enough to warrant its installation wherever a supply of wood is available, thus reducing shipping costs of both the raw material and the finished board. Another object is to provide a machine by which board of various lengths and widths can readily be produced without waste.

In general, the machine herein disclosed comprises a rigid platen, a movable bed disposed beneath the platen in spaced relation thereto, the platen and bed collectively defining an elongate passage, a loading apron at the entrance end of the passage constituted by a portion of the bed, means for depositing a molding composition in the form of a mat of loose particles, coated with a thermosetting binder, on the bed close to the entrance to the passage, of a thickness greater than the vertical depth of the passage, means for effecting movement of the bed in a direction to advance the mat into and through the passage, and means situated at the entrance of the passage for progressively compacting the mat to a thickness corresponding to the height of the passage as it is advanced thereinto. In one form of the apparatus compaction is effected by sloping the lower surface of the upper platen at the entrance end of the passage to form a wedge-shaped entrance into which a continuous mat of the material is advanced and by mounting a continuous belt or screen on the platen with a portion of it lying along the undersurface of the platen above the bed for movement therealong. The belt is free to move along the platen and movement is imparted thereto solely by the transmission of force to it from the movable bed through the mat as it becomes compacted between the bed and the belt. Preferably the belt extends throughout the entire length of the platen, however, it may be confined to the inclined portion thereof. In another form compaction may be effected by omitting the inclined portion at the end of the platen and mounting a wheel of large radius of curvature, adjacent the end, with its underside substantially tangent to the underside of the undersurface of the platen and sloping upwardly therefrom to form a wedge-shaped entrance corresponding to that formed by the belt into which the mat may be advanced. The wheel is mounted to turn freely and the force to effect its rotation is imparted to it solely by the mat as it becomes compacted, as it is advanced by the bed beneath the wheel. The travelling bed is comprised of a plurality of segments in the form of plates or bars slidable along the upper surface of a lower rigid platen and is driven, for example, by a ram operating on the endmost segment, plate or bar at any given time at the entrance end of the passage. The platens are heated by suitable means, are adjustable relative to each other to vary the final thickness of the compacted mat, and the belt or platen may contain a plurality of grooves or perforations, or the like, to permit escape of volatiles.

According to the use of the machine a layer of the molding compound which is comprised of loose particles of wood flour, sawdust, chips, shavings, or the like, coated with a thermosetting binder, such as a phenolic resin, is deposited on the travelling bed. As the bed is advanced beneath the inclined portion of the upper platen the loose mat is carried forward and simultaneously compressed between the bed and the sloping portion of the upper platen to a thickness corresponding to the vertical distance between the bed and platen. As the compound becomes more highly compressed friction between the particles increases greatly thus manifesting a higher apparent shear strength in the mat which permits transmission of the driving force from the bed through the material to the belt or wheel, thus causing the belt or wheel to move forward at the same rate as the traveling bed and thus assisting in drawing the loose uncompressed material into the wedge-shaped entry between the platens. As the mat of loose particles advances between the platen and the bed it is compressed to the desired board thickness and progressively cured. The length of run between the platens is determined by two factors: First, there must be a sufficient length of the compressed material so that its internal shear strength will be great enough to drive the belt or wheel while overcoming the friction between the belt and the platen carrying it, or to turn the wheel and also to overcome the component of force necessary to compress the loose mass to its reduced thickness; and second, an additional length of platen is required in order to provide sufficient time of dwell between the platens to allow the advancing compressed mass to cure completely. In other words, once the first condition is met then the greater the length of the platen, the higher the speed at which the board may travel and emerge fully cured. The board emerges as a continuous strip of uniform width and thickness which may be cut into panels of any desired length.

Other advantages and novel features of the machine will be apparent from the following detailed description.

FIG. 1 is a plan view of a machine constructed according to the invention;

FIG. 2 is a vertical section longitudinally of the apparatus taken on the line 2—2 of FIG. 1;

FIG. 3 is a vertical section transversely of the apparatus taken on the line 3—3 of FIG. 2;

FIGS. 4 and 5 are vertical fragmentary sections at the entrance end of the apparatus showing alternative forms of the means for compacting the mat as it is advanced into the passage;

FIG. 6 is a side elevation of a guide plate for controlling the width of the mat; and FIG. 7 is a transverse elevation, partly in section, showing a pair of guide plates adjusted so as to produce a mat narrower than the space between the side panels.

The various parts of the machine are shown mounted on a frame consisting of a pair of side panels 10 and 11. The upper platen 12, made of steel or other material of suitable strength and good heat conductivity characteristics, is suspended from the frame by means of studs 13 which extend through cross bars 14 mounted on the side panels. The studs slide loosely through the cross bars and are engaged by nuts 15 which limit the downward travel of the platen. Another series of cross bars 16 is mounted on the side panels. Each of these bars is threadably engaged by a pair of screws 17 which bear on the upper surface of the platen 12 and provide for adjusting the level of the platen. The upper platen contains a number of channels 18 through which steam is circulated for heating the platen. The lower platen 19 is permanently fixed to the side panels in any convenient manner and also has steam channels 20 for heating.

The upper platen 12 has a curved or sloping undersurface at the feed end, providing a graduated entry region or throat extending along the machine a distance indicated by the dimension A. Adjacent the feed end of the upper platen or left-hand end, as viewed in FIG. 2, is mounted a curved guide 21. Another curved guide 22 is mounted at the right-hand end of the upper platen. An endless belt 23, made for example of bronze mesh such as is used in Fourdrinier type paper machine, passes around the guides 21 and 22 and along the lower surface of platen 12. The undersurface of the platen is preferably highly polished to minimize friction between the screen and the platen. A perforated belt such as a screen is preferred because it permits volatiles to escape during the curing operation thus obviating the formation of blisters and affords additional friction between the mat and the belt by reason of a certain degree of penetration of the material into the perforations, thereby assisting in advancing the belt.

Optionally, as shown in FIG. 4, the travelling belt may be confined for the most part to the sloping part of the upper platen. To this end a slot 51 is made through the platen and a short belt 52 is mounted on curved guides 53 and 54 so as to travel endlessly along the inclined part of the platen, upwardly through the slot, and about the guides. In lieu of the belt 52, as shown in FIG. 5, the sloping part of the upper platen may be omitted and a wheel 55 of large diameter mounted with its lower side tangent to the lower surface of the platen. The lower curved surface 56 of the wheel provides an entrance similar to that obtained by the use of the belt.

Resting on the bottom platen are a number of rectangular plates 24 which form the travelling bed. These plates may be made of cast iron or a bearing metal such as bronze. The top surface of the lower platen is also highly polished. The plates 24 slide freely between the side panels 10 and 11.

To move the series of plates 24 through the machine a reciprocating ram driven by a hydraulic cylinder 25 of suitable conventional construction is mounted on the machine. The cylinder has a piston rod 26 on which is mounted a broad flat head 27. Between the ram and the lower platen is mounted a vertically movable table 28, which is moved up and down by a hydraulic cylinder 29, or other means. A plate 24a, of the series of plates 24, rests on this table in the path of the ram head 27. As the ram head advances, plate 24a is engaged by the ram and is pushed against the series of plates 24 to advance the entire series in the direction of the arrow 30.

A pair of guides 31 and 32, having upwardly curved end portions 31a, 32a and 31b, 32b, are mounted on the frame to form a return track for the plates 24. As the ram advances, the plate 24c at the right end of the lower platen, is pushed into the track, in turn pushing all the other plates 24, which are in the track in the direction of the arrow 33. Shortly after the beginning of the advance stroke, the table 28 drops down to the position shown by the dotted line 34 to receive a plate 24d, which emerges from the lefthand end of the track as the series of plates is advanced by the ram. On the return stroke of the ram the table 28 rises to place this plate in the path of the ram head. Guides 19a (FIG. 7), are fastened to the side panels 10 and 11 to support the plates until they reach the surface of the platen 19. The operation of the cylinders 25 and 29 is synchronized by any suitable control device. As thus constructed, at the feed end the bed has a horizontal portion situated between the place where the plates are raised into position to form a part of the bed and the left end of the upper platen, as shown in FIG. 2, which provides a loading apron upon which the material to be molded may be deposited close to the graduated entry or throat leading to the passage between the platens.

The width of the mat and the resulting board may be controlled by a pair of plates 58—58, disposed on edge at the lower end of the hopper, for adjustment widthwise of the bed, as shown in FIG. 7. The plates have sloping ends extending inwardly along the sloping undersurface of the platen so as to confine the deposit of molding composition as it is fed inwardly beneath the sloping portion of the platen during compaction. Flanges are provided at the lower ends of the plates for receiving bolts, adjustably to fix them in the desired position. Since the composition does not flow laterally after compaction, the width of the mat and thus also the width of the formed board, may be controlled entirely by the guide 58—58 at the entrance end of the passage, these guides extending into the entrance to approximately the point C of FIG. 2, and there will be no need for adjusting the spacing of the side panels 10 and 11, or placing inserts along the passage for the purpose of narrowing its width.

The material to be molded, which may be comprised for example of loose particles of wood flour, sawdust, shavings, or chips coated or mixed with thermosetting resin, is fed from a hopper (not shown), through a chute 36 onto the apron at the feed-in end of the moving bed. The chute has a front edge 36a, at a suitable level above the moving bed to deposit a mat of the desired thickness $t$, which is greater than the vertical depth of the passage between the platen and bed. As the movable bed is advanced by the ram, the mat 37 of loose particles is drawn under that portion of the belt 23 which underlies the sloping undersurface 12a of the upper platen 12.

As the mat enters between the screen belt and the travelling bed, the material becomes progressively compressed and heated. At the start there is very little load on the belt and it will slide easily along the upper platen. As the mat progresses further the load increases, but the material when it reaches the straight portion of the upper platen is compressed to such a degree that the internal friction between the particles in the mat will greatly exceed the friction between the screen and the platen, as will also the friction between the compressed material and the screen, thus permitting the transmission from the bed to the screen of a force sufficient to advance the screen through the press and overcome the resistance to compression which the material in the mat exerts upon being drawn into the wedge-shaped entry between the belt and the travelling bed. When the pressure and friction are not excessive and the angle of slope is not greater than about 25°, the compaction of the material as it is advanced through the wedge-shaped entry between the shortened belt (FIG. 4) or the underside of the wheel 55 (FIG. 5) suffices to advance the belt or wheel so as to compress the mass and draw it into the passage between the platens.

When the mat reaches point C, it has been compressed to the desired finished thickness of the board. The compressed material is maintained under pressure at this thickness as it progresses through the machine, the pressure perpendicular to the surface of the material gradually diminishing to zero at the discharge end of the machine. The fully cured board emerges as a continuous strip 50 which is the width of the mat of material spread at the feed end and is of the thickness of the spacing between the bed and screen belt. The emerging strip may be cut into boards of any desired length. For many purposes no other finishing or trimming of the board is required. The position of the upper platen 12 may be adjusted by means of screws 17 to produce boards of various thicknesses.

It is to be observed that compaction is obtained by pressure applied perpendicular to the opposite surfaces of the mat and not to an end of it as in an extrusion type machine where a ram operates on the material itself to push successive segments into and through the passage. This mode of compaction is particularly desirable because the grain of the finished board runs lengthwise thereof which greatly increases the bending strength of the board rather than crosswise of the board which makes for a weak board as formed by the extrusion process. Furthermore, by compacting the mat perpendicular to its opposite surfaces, the effect of moisture or humidity in causing transverse or longitudinal expansion may be held much lower than would be the case in an extruded board, in which compaction is applied endwise to the mat.

The length D of the curing region depends on the curing time for the particular resin used and the speed of operation desired. Preferably this length is such that the board remains in the machine somewhat longer than the minimum curing time to ensure complete curing of the board. It is apparent that the length D must be increased in proportion to the desired operating speed in order to achieve the same dwell in the machine for higher operating speeds. The speed of operation is limited only by practical considerations as to the size of the machine, whereas the speed of production of a conventional press is fixed by the required curing period.

As previously stated, there are certain requirements for successful operation of this machine. The coefficients of friction between the bed and the material and between the screen belt and the material, must be greater than the coefficient between the screen and the upper platen. Further, the apparent internal shear strength of the freshly compressed material must be greater, in the direction of travel, than the coefficient of friction between the screen and the upper platen, in order that the force applied to the bed will not only cause the bed to slide over the bottom platen but will also be transmitted through the mat of compressed material to impart a forward motion to the screen causing the screen to advance at the same rate as the bed. The advance of the screen and bed simultaneously will cause the freshly laid mat to advance to the wedge-shaped entry between the platens, while being progressively compressed. The tensile strength of the screen must be great enough to withstand the combination of stresses produced both by the friction between the screen and upper platen and also by the component of force necessary to produce compression of the mat of material as it enters the wedge. A low coefficient of friction between the screen and the upper platen can be readily achieved by polishing the undersurface of the platen and by proper selection of the materials. A bronze screen and a polished steel platen have proved satisfactory. Lubricant may also be applied between the screen and the platen.

Since the entering material is compressible and fibrous, it tends to form itself to the screen and thus produce an interlocked structure. Instead of a mesh screen, a bronze or other belt having a polished upper surface and a roughened undersurface may be used.

The coefficient between the material and the travelling bed normally tends to be relatively high because the material tends to form itself into any irregularities in the surface of the bed. The upper faces of the plates 24 may be somewhat roughened if necessary.

The frictional force between the bed and the bottom platen is immaterial as far as transmission of force through the board material is concerned, but should be kept to a minimum to reduce the load on the ram.

Another requirement is that the force necessary to drive the belt 23 should not exceed the shear strength of the material available to transmit the force. There are two forces to be overcome in driving the belt. One is the frictional force between the screen and the upper platen. This is a readily calculated function of the platen area, the coefficient of friction between the platen and the belt, and the pressure required to reduce a mat of given density and thickness to the finished board thickness. The second force to be overcome is the tension of the belt required to produce the necessary compressive force on the mat over the distance A. This can also be calculated as a function of the angle between the beveled surface 12a and the bed, related to the vertical pressure required to compress the mat to its finished thickness at the point C.

To transmit the drive force to the belt, there is available not only the material under the surface 12a, but the semi-cured and cured material in the curing region along the distance D. In the semi-cured and cured state the shear strength of the material is much greater than in the uncured mat state. There is a certain minimum length D, which can be determined for a given type of material, necessary for driving the belt. However, it is desirable to make the dimension D as long as practical in order to achieve satisfactory operating speed, and as a practical matter this length is ordinarily at least fifteen times the required minimum. One machine is thus suitable for handling materials of various densities and shear strength. A ratio of A to D of one to four is a satisfactory working value, but a ratio of one to eight will generally be found to be more practical from a production standpoint. The width of the press does not affect the above considerations as the drive force and the shear strength of the material both increase proportionately to the width.

The machine here described is relatively simple and inexpensive to build because the bed is the only driven member, and no complicated synchronizing mechanism is required for controlling movement of the screen belt. The adjustment of the machine for various thicknesses of board is made simply by raising or lowering the upper platen. This machine will produce board at a much faster rate than a conventional press of comparable size, because the entering material can be preheated close to the curing temperature and the necessary dwell in the machine is consequently shorter. This preheating cannot be done satisfactorily when using a conventional press, because the material on the loaded cauls would tend to become partially cured before entering the press.

There is practically no waste involved in manufacturing boards by this method and the cost of handling the boards is reduced to a minimum. Furthermore, it is practical to produce boards of any desired length without change in the machine.

While the foregoing description indicates that the board is produced in a horizontal plane, it is nevertheless possible to so dispose the machine that the platens will be vertical either edgewise or endwise with suitable means for confining the molding compound in the throat of the machine under such conditions.

*Example I*

A typical example of the machine and its operation are as follows:

The machine is so constructed that the platens are 50 inches wide, having steam platens 4 inches thick and supported such that the transverse deflection of the platen under load will not exceed 0.010 inch. The slope of the undersurface of the upper platen at the feed end (dimension A, FIG. 2) is 12.5°. The length $d$ is 12 feet.

Travelling bed segments are cast iron plates 3 inches wide by 50 inches long by 1⅛ inches thick, having the lower surface with a ground finish, and the upper surface with a rough planed finish.

To make a ¾ inch board of a density of 40 pounds per cubic foot, the upper platen is set so that the screen 23 is 0.800 inch above the travelling bed, thus providing an allowance of 0.050 inch for sanding.

A typical molding compound will be prepared from 86 parts by weight of birch wood shavings or flakes at a moisture content of 6 percent with 14 parts by weight of a urea-formaldehyde resin containing 50 percent of resin solids. This compound is deposited on the bed of the machine at the feed end in a uniform layer approximately 8 inches thick, having a weight of 2.7 pounds per square foot. The ram is operated at 6 strokes per minute, advancing the bed at an average rate of 18 inches per minute. The total force transmitted from the ram to the bed is approximately 60,000 pounds. The temperature of the platens is maintained at 325° F. The cured board emerges from the machine at this rate, is cut to the desired length, trimmed to exact width, and sanded prior to shipment.

*Example II*

Using the machine as in Example I, but set with a spacing of 0.300 inch between the screen and bed, as ¼ inch thick board is made as follows: Molding compound is prepared from 92 parts by weight of pine flakes at a moisture content of 6 percent treated with 8 parts powdered phenolic resin. This compound is then spread in a uniform layer on the bed at the feed end of the machine, said layer having a weight of 0.8 pound per square foot. The average rate of travel of the bed is adjusted at 4 feet per minute. With a platen temperature of 350°, and a force on the bed of 45,000 pounds, a board will be produced at 4 feet per minute, having a density of approximately 32 pounds per cubic foot. This board is edge-trimmed and cut off as it emerges from the press, and is subsequently sanded to a thickness of 0.250 inch.

*Example III*

A board is produced in the same manner and under the same conditions as in Example I, except that the molding compound is preheated to a temperature of 175° F. as it is being deposited on the bed of the machine, and the average rate of travel is increased to 30 inches per minute.

While a thermosetting binder is preferred, it is within the scope of the invention to employ any suitable binder which will set sufficiently during the course of movement of the mat between the platens to produce a strong bond. Thus thermoplastic binders may be employed which are available in several forms, to wit, air-drying or solvent-release, hot-melt or fusible and pressure sensitive. Among the more important thermoplastic adhesives are the cellulose esters, ethyl cellulose, polyvinyl acetate, polyvinyl butyral, polyvinyl chloride-acetate, acrylics, reclaimed and nonvulcanizing rubbers, and polystyrene.

It should be understood that the present disclosure is for the purpose of illustration only and that this invention includes all modifications and equivalents which fall within the scope of the appended claims.

I claim:

1. A machine, for manufacturing fibrous board from a mat of fibrous material, comprising a movable bed having a portion which is flat and rigid both transversely and longitudinally, a flat, rigid platen disposed above said bed and having an undersurface spaced from said flat, rigid portion of the bed, means for depositing on said bed a mat of particulate fibrous material the particles of which have been coated with a bonding agent, means for moving said bed to advance said mat between said bed and said platen to bond the particles in the form of a rigid board, and an endless belt movable along said undersurface and adapted to engage and be driven by the material disposed between said platen and said bed.

2. A machine as described in claim 1, said platen having an entry portion diverging from said bed, and said means for depositing the mat being disposed adjacent said entry portion.

3. A machine as described in claim 1, said belt having a low coefficient of friction with respect to said platen, said belt and bed having opposed surfaces adapted to produce coefficients of friction within said material greater than the coefficient of friction between said belt and said platen.

4. A machine, for manufacturing a fibrous board, comprising a lower heated platen, a travelling bed composed of a plurality of separate rigid members extending transversely across said platen and disposed side by side, an upper heated platen disposed above and having an undersurface spaced from said bed, an endless belt movable along said surface, means for depositing a mat of fibrous material coated with a bonding agent on said bed, and means for advancing said bed to draw the mat between said belt and said bed and to move said belt solely by contact with said mat.

5. Molding apparatus comprising rigid, rectangularly disposed top and bottom members which collectively define an elongate passage having entrance and discharge ends, the ends of the top and bottom members at the entrance to the passage being longitudinally offset so that a portion of the bottom member serves as a loading apron for receiving a mat of moldable material comprised of loose particles coated with a bonding agent, means for heating the top and bottom members, means for depositing a mat of molding composition on the apron, adjacent the entrance to the passage, compacting means having a portion above the apron arranged to move along an incline from a plane above the loose mat, downwardly into the plane of the underside of the top member, the inclined portion of said compacting means in conjunction with the bottom member constituting a wedge-shaped throat at the entrance to the passage operable by relative movement of the incline portion of the compacting means and the bottom member toward each other as the bottom member is advanced through the throat, progressively to compact the mat as it is advanced, to a thickness corresponding to that of the passage, and means for effecting movement of said bottom member, movement of said compacting means being effected solely by forces transmitted to its inclined portion through the mat as the latter becomes compacted between said inclined portion and the bottom member.

6. Molding apparatus comprising a pair of rigid, vertically spaced top and bottom plates collectively defining an elongate passage having open entrance and discharge ends, the top and bottom plates diverging relative to each other at the entrance to the passage so as to form a wedge-shaped throat, and the bottom plate having a portion extending beyond the end of the top plate so as to form a loading apron at the entrance to the throat, a plurality of carrier bars disposed on the bottom plate transversely thereof, for movement along the passage with their adjacent edges abutting and transmitting the motion of one to the next in the direction of movement, means for imparting movement to the endmost one of the bars at the entrance end, means for heating the top and bottom plates, means for distributing a mat of moldable composition comprised of loose particles, coated with a thermosetting binder on the apron, close to the throat and means movable along the inclined surface of the top plate as the mat is advanced by the bars to facilitate such movement, motion being imparted to said last-named means solely by components of force transmitted thereto through the mat.

7. Molding apparatus comprising means mounting a pair of vertically spaced endless members with portions converging and other portions parallel, said portions being uniformly flat and rigid both transversely and longitudinally, means for depositing a molding composition comprised of a loose mat of particles coated with a thermosetting binder on the lower member adjacent the converging portions, means for heating the top and bottom members, and means for effecting movement of the lower member to advance the loose mat through the converging portions into the space between the parallel portions, said upper member being free to move and deriving its motion solely from forces imparted thereto by the mat carried forwardly on the bottom member.

8. Molding apparatus comprising means mounting a pair of vertically spaced upper and lower endless members having converging and parallel portions, means supporting the endless members so that the converging and parallel portions are uniformly flat and rigid both transversely and longitudinally, means including a doctor blade for depositing a mat of molding composition of predetermined thickness on the lower member, said doctor blade being adjustably spaced from the lower member by an amount exceeding the distance between the surfaces of the converging portions where they merge with the parallel portions, means for heating the parallel portions, and means for advancing the lower member to carry the mat thereon through the converging portions into the space between the parallel portions, said upper member being freely movable and moved solely by forces imparted to it through the mat as the latter is advanced in the direction of feed.

9. Molding apparatus according to claim 1, wherein there is means situated between the means for depositing the molding composition on the apron and the bed and platen to control the width of the mat.

10. Molding apparatus according to claim 5, wherein there are spaced parallel plates situated between the means for depositing the molding composition on the apron and the entrance end of the passage for controlling the width of the mat and means mounting the plates perpendicular to the bed for adjustment widthwise thereof relative to each other, to vary the spacing therebetween.

11. Molding apparatus according to claim 1, wherein there is adjustable means for changing the spacing between the platen and bed.

12. Apparatus according to claim 1, wherein the endless belt contains a plurality of vents for permitting volatiles to escape from the mat during curing.

13. Molding apparatus comprising a movable bed, a rigid platen disposed in spaced relation thereto, said bed and platen collectively defining an elongate passage having entrance and discharge ends, an apron constituted by an extension of the bed at the entrance end of the passage for receiving a deposit of molding composition, a belt mounted adjacent the entrance end of the platen with a portion of it inclined downwardly toward the bed in the direction of feed, and forming with the bed a wedge-shaped throat through which the molding composition deposited on the apron is moved by the bed as it is advanced into the entrance end of the passage, and means for heating the bed and platen, said belt being free to travel in the direction of feed and motion being imparted thereto solely through forces transmitted thereto from the bed by way of the mat being compacted therebetween as it moves toward the entrance end of the passage.

14. Molding apparatus comprising a movable bed, a rigid platen disposed in spaced relation thereto, said bed and platen collectively defining an elongate passage having entrance and discharge ends, an apron constituted by an extension of the bed at the entrance end of the passage for receiving a deposit of molding composition, a wheel of large radius of curvature mounted adjacent the entrance end of the platen with its bottom side substantially tangent to the bottom surface of the platen and its surface sloping upwardly away from the point of tangency and forming with the bed a wedge-shaped throat through which the composition is advanced to the entrance end of the passage, means for heating the bed and platen, and means for effecting movement of the bed, said wheel being turned solely by forces transmitted to it from the bed by way of the mat as it is moved forwardly between the wheel and bed.

15. A molding apparatus comprising spaced heated platens, endless guides associated with the respective platens, a plurality of rigid members supported by the endless guide associated with one of the platens, said rigid members being movable along the guide edge-to-edge and collectively forming a flat bed rigidly supported by the platen and movable therealong by endwise movement imparted to one of the elements at one end of the bed, a ram disposed at one end of the bed at the level thereof for engagement with the endmost member at that end of the bed to push it toward the other end, said ram being movable a distance to advance the bed a distance corresponding substantially to the width of one of said members, and an endless element idly supported by the guide means associated with the other platen having a portion spaced from and substantially parallel to the bed and a sloping portion, one end of which is at a level with the parallel portion and which diverges from said level relative to the bed, said endless idle element having motion imparted thereto solely by the material drawn beneath it by the bed, the diverging portion operating to apply a compacting force substantially perpendicular to the bed to apply compacting pressure and the parallel portion applying a force parallel to the bed to effect feeding.

References Cited in the file of this patent

UNITED STATES PATENTS

| | | |
|---|---|---|
| 1,540,650 | Prather | June 2, 1925 |
| 1,931,570 | Brown et al. | Oct. 24, 1933 |
| 2,648,262 | Croston et al. | Aug. 11, 1953 |
| 2,678,081 | Rainard et al. | May 11, 1954 |
| 2,697,677 | Elmendorf | Dec. 21, 1954 |
| 2,779,969 | Bose | Feb. 5, 1957 |
| 2,798,019 | Verbestel | July 2, 1957 |
| 2,876,153 | Dorland et al. | Mar. 3, 1959 |
| 2,923,030 | Himmelheber et al. | Feb. 2, 1960 |
| 2,923,968 | Erickson et al. | Feb. 9, 1960 |

UNITED STATES PATENT OFFICE
CERTIFICATE OF CORRECTION

Patent No. 3,044,111                                            July 17, 1962

Robert A. Caughey

It is hereby certified that error appears in the above numbered patent requiring correction and that the said Letters Patent should read as corrected below.

In the grant, lines 2 and 12, and in the heading to the printed specification, lines 4 and 5, name of assignee, for "Antrim Moulding Company, Inc." read -- Antrim Molding Company, Inc. --.

Signed and sealed this 18th day of December 1962.

(SEAL)
Attest:

ERNEST W. SWIDER                                    DAVID L. LADD
Attesting Officer                                          Commissioner of Patents